Feb. 25, 1964 D. A. RUDATIS 3,122,670
METHODS AND DEVICES FOR PRODUCING POLYCHROMATIC
IMAGES FROM MONOCHROMATIC SIGNALS
Filed June 23, 1960 4 Sheets-Sheet 1

INVENTOR
DOMENICO A. RUDATIS
BY
Charles J. Elderkin
ATTORNEY

INVENTOR
DOMENICO A. RUDATIS
BY
Charles J. Elderkin
ATTORNEY

INVENTOR
DOMENICO A. RUDATIS
BY
Charles J. Elderkin
ATTORNEY

INVENTOR.
DOMENICO A. RUDATIS

BY Charles J. Elderkin
ATTORNEY ated Feb. 25, 1964

United States Patent Office 3,122,670
Patented Feb. 25, 1964

3,122,670
METHODS AND DEVICES FOR PRODUCING POLYCHROMATIC IMAGES FROM MONOCHROMATIC SIGNALS
Domenico A. Rudatis, 134—21 Cherry Ave., Apt. 3–C, Flushing 55, N.Y.
Filed June 23, 1960, Ser. No. 38,149
15 Claims. (Cl. 313—89)

This invention relates, in general, to unique methods for producing polychromatic luminescent images, and to improved luminescent screens and similar devices based thereon. More particularly, the invention involves the provision of a special combination of luminescent layers capable of emitting specific colors upon excitation and specifically proportioned to transform a range of luminances into a range of different colors all corresponding to different wave lengths, the chromatic values of said different colors including certain basic reference colors representing some predetermined brightness values. In a specific sense, the invention finds particular application to the production of polychromatic images from signal energy derived through use of normal monochromatic facilities and intended for use in the production of normal monochromatic reproductions.

Though various systems have been provided heretofore for producing polychromatic luminescent images, they require the use of special electronic and optical components, among other things, and are relatively complicated and expensive. For example, the production of polychromatic luminescent images as realized in current colored television receivers requires use of special video cameras, transmitting equipment and receiving equipment, whereas in accordance with the principles of my invention, a polychromatic luminescent image is realized through the use of conventional unmodified black and white video cameras, transmitters and receivers by the simple expedient of substituting a luminescent screen of the invention for the normal luminescent screen of the television receiver.

In all conventional bicolor processes, the two color components are complementary to each other, in the sense that, when mixed in proper proportions, they generate white. As a result, whereas such systems are capable of generating a range of colors, all such colors include only two hues, namely, the two hues of the two primary colors with variations of saturation.

In contrast to such known practices, the present invention utilizes two primary colors which are not complementary to each other, such that their color mixtures are capable of producing many different hues, and a range of hues based on the greatest possible variations obtainable with two primary colors. Accordingly, the invention provides means for adding to the normal brightness indications, the maximum amount of additional visual intelligence and aesthetic effects that may be obtained by intelligence and aesthetic effects that may be obtained by means of the very same electronic signals, or modulated radiant energy, for example, and two luminescent materials.

It is a general object of my invention to provide means for producing colored images through the use of any signals intended for normal monochromatic reproduction. Thus, the invention finds direct utility in any system in which a screen is normally used for generating a monochromatic luminescent image, as, for example, television, X-ray analysis and the like, radar and similar video instrumentation, whereby the replacement of the normal screen with a screen produced in accordance with my invention results in the production of a polychromatic luminescent image in which all brightness differences are also chromatic differences, i.e., all combinations of the color components have different hues and the range of hues is substantially inclusive of the richest variety of perceptible chromaticity differences.

A further object of my invention is to provide luminescent screens in which use is made of the most basic color mixtures obtainable with two color components to represent a predetermined range of colors having predominant importance.

A still further object of the invention is the proportioning of components within a luminescent screen to obtain a prevalence of each primary color in shadow and highlights for the most effective and pleasing optical effects.

The invention further provides for a specific choice and arrangement of the luminescent screen components to attain an adequate correlation between the brightness range and the color range upon excitation of said components.

With particular reference to its application to television receivers, the invention provides means whereby a polychromatic image can be derived from a video signal intended for monochromatic reproduction, with the image including color effects corresponding with relative accuracy to the natural appearance of certain objects or subjects which appear with frequency in televised scenes and are readily recognizable to the viewer, such color effects thereby affording a standard for the range of colors presented in the image.

New and specific features of my invention also include the utilization of a luminous colored framing structure for improving the color control obtainable with the novel luminescent screens of the invention; the double utilization of the conventional brightness control on a television receiver to provide both brightness and color control; and the similar double utilization of the conventional contrast control on a television receiver to control contrast as well as colors in a new and different manner.

Still another object of my invention involves the production of polychromatic images from video signals intended for monochromatic reproduction, in such manner that chromatic stereoscopy is achieved.

In order to understand in detail the manner in which the foregoing as well as other features and objects are attained in accordance with the invention, reference is had to the accompanying drawings, which form a part of this specification, and wherein.

In general, the objects of the invention are achieved by providing a novel luminescent screen which is capable of being excited, as by the electron beam of a conventional cathode ray tube, for example, to emit light of two color components mixed, in accordance with the received video signal, for example, to provide in the image as viewed a range of colors extending from shadows to highlights, the average color of a selected readily recognizable object being reproduced with relative accuracy as a base or reference within the range of colors emitted by the screen. Advantageously, the average complexion colors of the human skin are the colors selected for relatively accurate reproduction. Since the novel luminescent screen can be excited by the usual picture tube electron beam in response to video signals intended for monochromatic reproduction, the invention makes it possible to convert a conventional black and white television receiver to color operation simply by substituting the novel luminescent screen for the usual black and white screen in the conventionally employed picture tube.

In conformity with the present level of this art, it is known that luminescent monochromatic images, and more particularly, as well as customarily, black and white television images are produced by an electron beam activating a luminescent material which coats the internal side of the glass face or screen forming the large end of the picture tube. This luminescent material is a mixture of different phosphors, and, generally, two phosphors are mixed, each one emitting light complementary to the other, so that substantially white light is emitted by the luminescent screen no matter how excited by the electron beam. In this way, black and white images are generated into the conventional luminescent screens used in all black and white television receiver sets, these images resulting in a translation in mere brightness values of all natural colors of the scenes successively transmitted and received by any kind of black and white television system.

It is very evident that the translation of all natural colors into mere brightness values reduces substantially the contents of the scenes, as the enormous variety and richness of natural colors are totally lost.

Four fundamental facts must be put into evidence in order to recognize the extent to which the translation of natural colors into mere brightness values is defective and, proportionally, the extent to which the present invention is effective in restoring colors.

First: all colors being lost, the images look unnatural and ghostly in comparison with colored images even if their color fidelity is very limited, so that all color additions increase substantially the advertising value as well as the entertaining value of the received images.

Second: the brightness values that may be included in television images are extremely reduced in comparison with those inherent to natural scenes, so that in black and white television not only are all color differences lost, but, in addition, a great part of the natural brightness values is inevitably lost.

Third: in black and white television one loses not only all colors but also all effects of hues and saturations upon brightness, inasmuch as the translation of colors in mere brightness values is always achieved without taking into account the brightness variations inherent to the effects of hues and saturation, that is to say, without taking into account the Helmholtz-Kohlrausch effects which may often represent differences of luminance above 50 percent (Zur Photometrie farbiger Lichter, by A. Kohlrausch, Licht, 1935, pages 259–260, 275–279; Ueber den Einfluss von Farbton und Sättigung auf die Messungen verschiedenfarbiger Lichter, by A. Dresler, Licht, 1937, pages 203–208). As a matter of fact, the translation of natural colors in mere brightness values is doubly defective for the reason that the standards of colorimetry and photometry are not in agreement (A New Look at Colorimetry, by D. L. MacAdam, Journal of the Society of Motion Picture and Television Engineers, 1955, pages 629–631).

Fourth: without any colors, no chromatic stereoscopy may exist, and consequently black and white television is deprived of a basic stereoscopic effect which, on the contrary, is perfectly restored by the present invention, as will be explained in greater detail hereinafter.

Notwithstanding the foregoing factors, black and white television is widely accepted, largely by reason of the fact that any black and white reproduction is always simpler and less expensive to achieve than the corresponding color reproduction. Thus, we are now largely accustomed to the very defective translation of color realized in black and white by photography, printing, motion picture, and television. The artistic and suggestive values of color, nevertheless, may not be replaced or minimized.

In a true color television system, apart from the fact that any color television camera, transmitter, and receiver are much more complicated and expensive than the corresponding parts for effecting reproductions in black and white, it must also be noted that color television is necessarily defective as black and white service in representing brightness values. Moreover, it is necessarily defective in representing color saturations, and very often defective, at least at the present level of the art, in representing hues. In addition, the difficulties inherent to the color controls may hinder common viewers from attaining satisfactory results.

The present invention consists essentially in a specific combination of all of the advantages of black and white television with many advantages of color television, avoiding, at the same time, all complications, expenses, and difficulties inherent to color television. Thus, as pointed out hereinabove, the present invention operates by means of the same equipment utilized for normal black and white television and, using some inexpensive and very simple additional means, namely, a substitute luminescent screen, achieves many color effects, such that the results are a very desirable intermediate between black and white television and true color television. To re-emphasize this important feature of my invention, natural scenes are normally picked up by a conventional black and white television camera and are then transmitted and received by conventional black and white television transmitters and receivers. Thereafter, the final signals representing the luminance values of the original image are utilized in a conventional picture tube having the standard screen replaced with a luminescent screen capable of generating colored images in accordance with the principles of my invention. Other arrangements creating special environmental color effects may be annexed to the black and white television receiver sets when additional color controls and improvements are desired as explained hereinafter.

For a general consideration of the invention, as applied to television, it must first be recognized that overall color fidelity is not a prerequisite for pleasingness of a colored image. As a matter of fact, complete fidelity is not possible in color reproduction. Further, the viewer of a color television picture, for example, is not able to say whether the colors are faithfully or unfaithfully reproduced, there being no way to make a direct comparison between the picture and the original scene, evaluation of the colors thus being based mainly upon the viewer's recollection of natural colors of objects of the type appearing in the picture. Additional uncertainty as to the fidelity of the color reproduction in the picture arises because all colors of any natural scene vary considerably in accordance with the conditions of illumination, so that the comparative color patterns provided by the viewer's memory represent only generic averages.

Specifically, all color effects are continuously modified by illumination, contrast and adaptation, as well as by numerous extremely complicated psychophysical, physiological and psychological interactions. Nevertheless, the colors of familiar things remain the same, for practical purposes, due to the known phenomenon of color constancy. The color perceptions of the viewer do not change so much as do the physical colorimetric values of the light entering the viewer's eye. As a consequence, a satisfactory colored image can be obtained by suggesting the colors approximately and with reference to some basic, recognizable color of the image, the suggestion being adequate because of the viewer's color memory and the viewer's expectation about the colors viewed.

Relatively accurate reproduction of a selected color or colors as a base or reference is a characteristic and important feature of the invention and success in practicing the invention is affected by proper choice of the base or reference. While, as has been pointed out, a very considerable variation from true color is possible without the image becoming objectionable to the viewer, less variation is allowable in the case of certain colors than in the case of others. Specifically, in reproducing scenes of the kinds most frequently transmitted by television, the complexion colors of the human skin cannot be changed so extensively and freely as can other colors if the image is to remain pleasing to the viewer. I accordingly find it advantageous to select the average complexion colors as a standard base or reference color in accordance with the invention. It is, of course, recognized that skin colors may change because of sun tan, make-up, illumination and contrast effects. Nevertheless, the color patterns in the memories of television viewers are better defined for complexion colors than for the colors of other objects.

Figure 1:
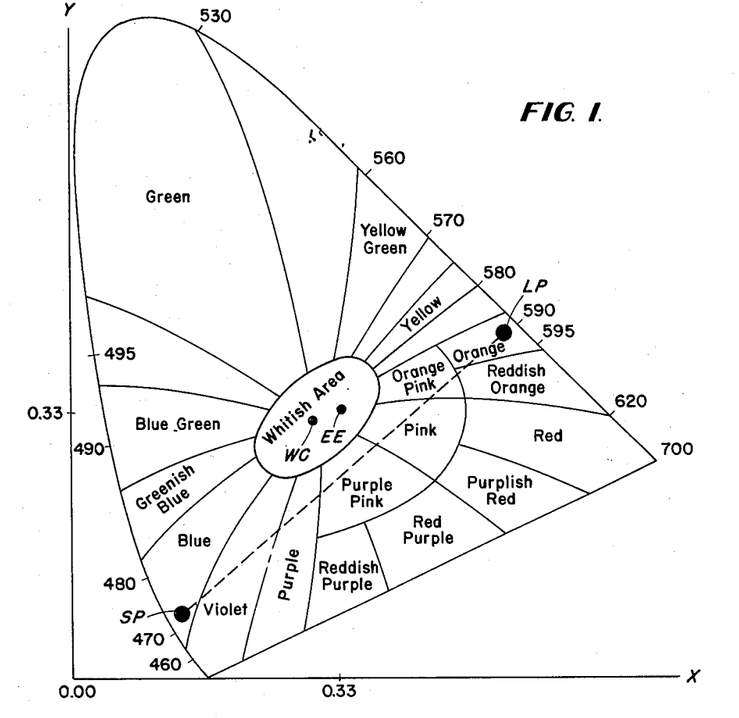
FIG. 1 is a standard chromaticity diagram illustrating the basic color relationships involved in the invention.

It has been shown, in the investigation of chromaticity variations by spectrophotometric measurements, that the average complexion colors are contained within those areas of the chromaticity diagram which are commonly designated as purple-pink, pink and orange-pink (Color Reflectance of Human Skin, by Allen Stimson and Edward Fee, Journal of the Society of Motion Picture and Television Engineers, May 1953, pages 553-558) these areas being shown in the standard chromaticity diagram of FIG. 1. The color areas and color names in FIG. 1 correspond to the most general and systematic usages (Color Designations for Lights, by K. L. Kelly, Journal of the Optical Society of America, 1943, pp. 627-632). It is to be noted, however, that the diagram of FIG. 1 includes a slight modification of color designations and a reduction of the delineation of the whitish area, this having been done in order to show unsaturated colors and to improve the representation of color ranges concerned in the invention. The diagram thus illustrates more adequately the transition from white to unsaturated colors and is more in agreement with recent practice as evidenced, for example, by Plate 24 of The Science of Color, Committee on Colorimetry of the Optical Society of America (1953). In the whitish area of FIG. 1, point WC indicates the Standard Illuminant C and the point EE is the equal energy white corresponding to coordinates 0.33, in conformity with the conventional designations.

It is to be understood, with respect to FIG. 1, that the transition from one color area to another contiguous color area is a transition representing a continuously and progressively changing color. Accordingly, in each area indicated in the diagram, the color is not uniform and the corresponding color designation represents an average hue as well as an average saturation inclusive of different hues and different saturations. The orange-pink area represents desaturated orange and desaturated reddish orange, the pink area represents desaturated red and desaturated purplish-red, and the purple-pink area represents desaturated red-purple and desaturated reddish-purple. Accordingly, it is obvious that all complexion colors are desaturated colors occupying an intermediate position between the whitish area and the saturated colors limited by the spectrum colors and the most saturated purple.

In accordance with my invention, all of these colors are produced by means of a novel luminescent screen which includes two light emitting materials so selected and arranged to be adequately activated by the different current densities inherent to shadows and highlights; low current densities activating more efficiently the short-wave colored light emitting material, and the higher current densities activating more efficiently the long-wave colored light emitting material. In a practical embodiment of the invention, a luminescent screen is provided consisting of two different superimposed layers of luminescent material; the layer nearer to the viewing side of the screen being a long-wave colored light emitting phosphor saturated only by high current densities, and the layer nearest to the electron gun being a short-wave colored light emitting phosphor saturated by low current densities. For example, as a practical illustration of primary color selection according to the invention, in the classical chromaticity diagram of FIG. 1, LP indicates a long-wave primary color corresponding to an orange light emitting phosphor, and SP indicates a short-wave primary color corresponding to a blue light emitting phosphor.

Selection of the average complexion colors as the base or reference color combination in accordance with the invention is predicated in part upon the fact, which has been shown by spectrophotometric investigations, that the variations of complexion colors under different daytime illuminations are not extended spatially to any significant degree, since the variations of saturation remain of no practical importance. Rather, the variations of complexion color are extended linearly in a very specific and significant way, this linear extension corresponding substantially to a straight line connecting the blue area and the orange area of the chromaticity diagram (Color and Reflectance of Human Flesh, by Allen Stimson and Edward Fee, May 1953, Journal of the Society of Motion Picture and Television Engineers, FIG. 3, page 555). Since all variations of complexion color are extended in this specific maner in the purple-pink, pink and orange-pink areas along a straight line connecting the blue and orange areas, it follows that all variations of complexion color correspond to various combinations of two color components, namely, a blue and an orange. Accordingly, it is advantageous to select some blue and orange as the two colors to be emitted by the novel luminescent screen of the present invention.

Selection of blue and orange as the two primary colors has other important effects in addition to making it possible to provide with reasonable accuracy the full range of complexion colors. It is a generally recognized fact that shadows can be successfully represented as having a blue or bluish color and that highlights can be successfully represented as having a more or less predominant yellow, orange or yellowish color. Adaptation phenomena, the Purkinje effect, and many complicated contrast effects contribute to the prevalence of blue color in shadows. Conversely, adaptation and contrast effects contribute to the prevalence of yellowish colors in highlights. General artistic experience in this regard really corresponds to visual experience. As a matter of fact, any light which appears neutral, that is, more or less white, at a level of intensity corresponding to the adaptation, tends to appear bluish at a lower intensity and yellowish at a higher intensity (An Introduction to Color, by Ralph M. Evans, 1948, page 131).

Selection of a blue and an orange as the color components not only provides for generation of purple-pink, pink and orange-pink as color combinations representing the range of skin complexion colors, but also includes purple, violet and blue as a range of colors having progressively increasing saturation and progressively decreasing brightness. Moreover, this selection of color components also provides for unsaturated orange highlights. Consequently, the selection of blue and orange provides the most efficient conditions for transforming shadows and highlights of conventional black and white television images into colored shadows and highlights suggesting natural color effects by different hues, saturations and brightnesses. Further, it is to be noted that the region of the chromaticity diagram between blue and orange corresponds to much more perceptible color differences than in the case of medium-wave color regions. Thus, selection of the primary colors in accordance with the invention realizes not only the most extended color range, including the average complexion colors, but also the most extended color range in comparison with other regions of the chromaticity diagram, including medium-wave colors (Color In Business, Science and Industry, by Deane B. Judd, 1952, page 241).

Considering operation of the invention in general, with blue and orange selected as the primary colors to be generated in various mixtures in accordance with a received video signal, the result is to provide an image in which shadows and highlights appear in approximately natural colors, even though the color range be limited, and the average complexion colors are naturally represented.

Figures 2, 4:
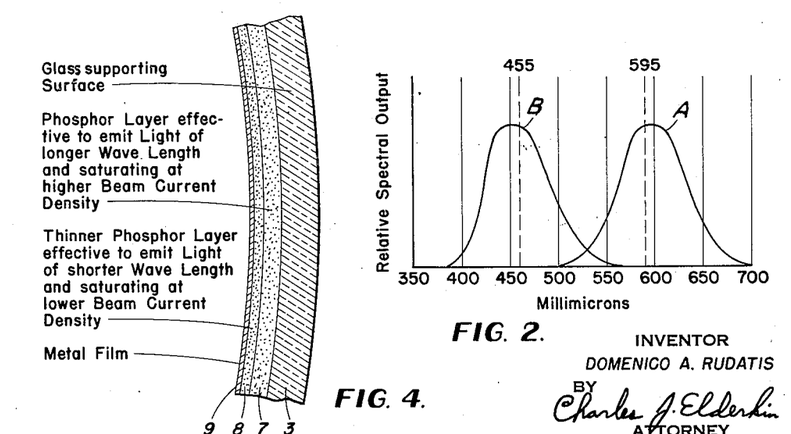
FIG. 2 is a diagram illustrating the relative spectral outputs of luminescent materials employed in one embodiment of the invention.
FIG. 4 is a fragmentary, greatly enlarged, sectional view of the image screen of the cathode ray tube of FIG. 3.
Figures 3, 6:
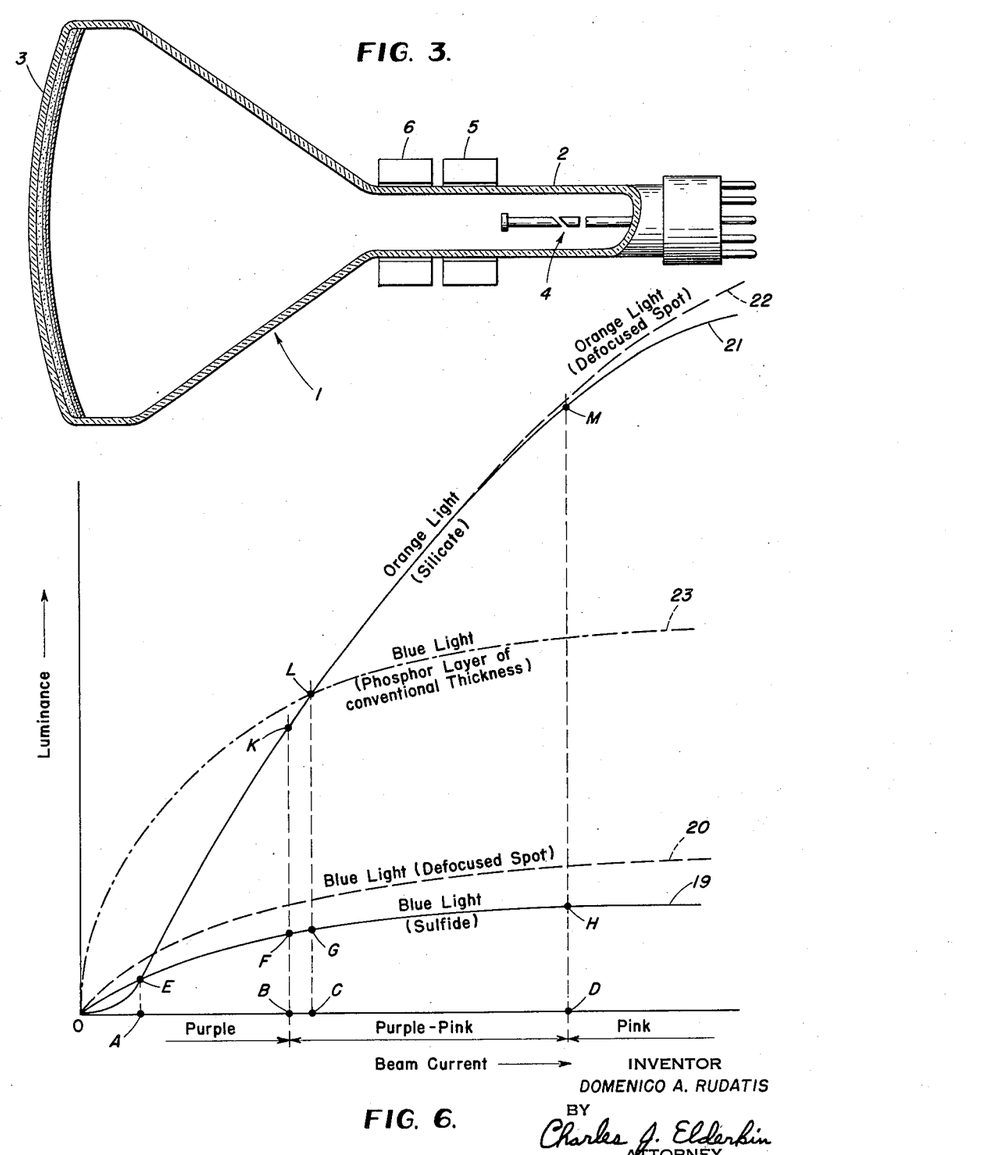
FIG. 3 is a simplified illustration of a cathode ray tube constructed in accordance with one embodiment of the invention.
FIG. 6 is a graph comparing the luminance of certain luminescent materials employed in the invention and illustrating the manner in which such materials act in conjunction to yield light of a desired range of colors.

To illustrate the general physical arrangement of the invention, FIGS. 3 and 4 illustrate a cathode ray tube constructed in accordance with the foregoing principles and, as seen in FIG. 3, there are included the usual glass envelope 1 including a neck portion 2 and an enlarged bulb portion presenting an end wall 3 occupying the screen area and serving as the support means for the luminescent material employed. In neck portion 2 of the tube, there is provided the usual electron gun, indicated schematically at 4, which acts in the well-known fashion to produce an electron beam for exciting the luminescent material. In response to the received video signal, the electron beam is focused in the usual manner by focusing coil 5 and is deflected, to scan the screen area, by deflecting yoke 6.

Extending continuously over the inner surface of end wall 3 of tube 1, and adhering thereto, is a first layer of luminescent material 7. A thinner luminescent layer 8 extends continuously over and is adhered to layer 7. A thin metallic film 9 extends over the surface of layer 8 and is adhered thereto to complete the screen. Considering that a blue and an orange have been selected as the primary colors in accordance with the invention, the thicker layer 7 is of a material effective to emit orange light when excited by the electron beam, and the thinner layer 8 is of a different luminescent material effective to emit blue light when excited by the electron beam.

Several known phosphors, with adequate activators, are presently available for use in preparation of the two luminescent layers 7 and 8. I find it advantageous to employ as the luminescent material for layer 7 a phosphor chosen from the silicates which saturate at high electron beam current density. Specifically, a very effective material is a manganese-activated zinc-beryllium silicate. As the luminescent material for the thinner layer 8, I can employ a phosphor selected from the sulfides which saturate at low electron beam current density. Specifically, I can employ a silver-activated zinc sulfide, in either cubic or hexagonal form, as the luminescent material for layer 8. FIG. 2 shows relative spectral output curves for typical examples of these two phosphors according to the wave lengths of the visible spectrum. Here, curve A is for the manganese-activated zinc-beryllium silicate phosphor and shows a maximum relative emission at about 595 millimicrons. Curve B is for the silver-activated zinc sulfide phosphor in cubic form and shows a maximum relative emission at about 455 millimicrons. It will be understood that both curves A and B are merely representative and may vary with the manner in which the phosphor is prepared and the specific composition thereof. Thus, the point of maximum emission can be shifted with relative ease to provide a precise selection of the primary colors in accordance with the invention. In this connection, the presence of beryllium shifts the relative maximum emission from green toward red, for example (Television, by V. K. Zworykin and G. A. Morton, 2nd edition, 1954, page 84).

Of course, as curves A and B, FIG. 2, demonstrate, both of these phosphors emit light of various different wave lengths and accordingly do not produce monochromatic colors. Nevertheless, they do produce colors which are, for practical purposes, very near to the spectrum so as to be saturated colors, particularly in view of the fact that there is no significant overlap between the two curves. Furthermore, the phosphors referred to have a very short decay time and are therefore especially suitable for the generation of television images. Further, because of the short decay time, no cascade effect need be considered. Finally, the phosphors referred to are particularly useful in accordance with the invention because they have colorless crystals, as well as colorless reflection, so that each of layers 7 and 8 will be essentially transparent to the light emitted by the other.

It will be apparent that, considered separately, luminescent layer 7 is effective to emit light of a color which can be represented by a point in the orange area of the chromaticity diagram, as at LP in FIG. 1. Similarly, layer 8 is effective to emit light of a color which can be represented by a point in the blue area of the chromaticity diagram, as at SP in FIG. 1.

Figure 5:
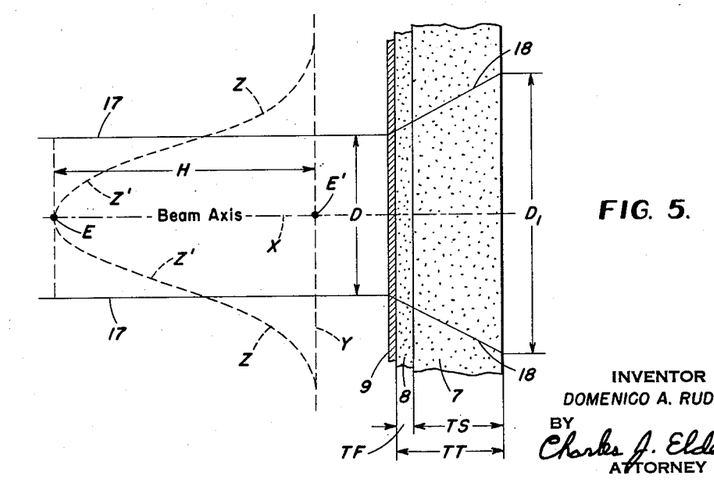
FIG. 5 is a diagram illustrating the relationship of the electron beam to the image screen in the cathode ray tube of FIG. 3.

Referring to the diagrammatic representation of the electron beam and luminescent screen in FIG. 5, it will be apparent that the thicker luminescent layer 7, i.e., the long-wave colored light emitting phosphor saturated only by high current densities and practically exemplified by the orange emitting manganese-activated zinc-beryllium silicate (thickness=TS), can be excited only to the extent that the electron beam first penetrates through the thinner luminescent layer 8, i.e., the short-wave colored light emitting phosphor saturated by low current densities and practically exemplified by the blue emitting silver-activated zinc sulfide (thickness=TF). The electron beam is designated by reference numeral 17 in FIG. 5, and its axis X is shown as being normal to the face of the screen. Within the luminescent screen, the electron beam is designated by reference numeral 18.

It must be noted that, precisely considered, the electron beam and the scanning spot do not have limits which are exactly defined. It is known, however, that the distribution of power density in the scanning spot can be represented by the error-function curve designated by Z and Z' in FIG. 5 referred to the base axis Y corresponding to the face of the screen met by the beam. The total area of curve Z—Z' as bounded by axis Y is equal to that of a rectangle of height H and width D. Thus, the height H represents the maximum power density in the scanning spot, corresponding to the axis X of the electron beam, as the maximum value of the curve is the distance between the points E and E'. If the scanning spot has the diameter D and is assumed to have a uniform power density, the value H also represents the effective power density of the scanning spot. Taking D as the effective diameter of the scanning spot, the spot will generate a flat field when the vertical dimension of the scanning line is equal to the diameter D. Since the power is the product of the beam current times the voltage, and since the voltage is maintained substantially constant, the distribution of power density in the scanning spot corresponds to that of the intrinsic current density within the scanning spot, as distinguished from the conventional current density referred to the area of the screen.

When a metal film 9 is deployed over the luminescent screen material, the electron beam simply passes through it, entering the first phosphor layer 8, and, successively, the second phosphor layer 7. The electrons are progressively scattered (18) and the diameter D corresponding to the scanning spot upon the inner surface of the screen 5 is progressively enlarged in accordance with the penetration of the electron beam into the phosphor layers. Accordingly, as shown in FIG. 5, the effective diameter D of the electron beam becomes, as a final result, the diameter $D_1$ corresponding to the total penetration of the beam through the total thickness TT of the luminescent screen. For all practical purposes, the actual enlargement of the beam from diameter D to the diameter $D_1$ is proportional to the total thickness of the luminescent screen. As the effective diameter of the electron beam is merely a simplified statistical replacement of the real distribution of the electrons defined by the curve Z—Z', so too, the enlarged diameter $D_1$ is merely a replacement of the total and real enlargement which is necessarily more extensive but not subject to precise definition. It follows that all of these various enlargements of the scanning spot within the luminescent screen are unavoidable defocusing effects, which are accompanied by a proportional reduction in the intrinsic current density of the scanning spot.

It is interesting to note that, in television engineering, it is customary practice to consider the beam current density as the ratio of the total beam current to the entire surface of the screen, so that intrinsic scanning spot values are disregarded (Television Engineering, by Donald G. Fink, 1952, page 127). Such customary practice is not adequate in the present consideration, however, since it is known that a given beam current acting upon a given luminescent screen will produce markedly different luminescences as the size of the scanning spot is changed, as by defocusing (An Introduction to Luminescence of Solid, by H. W. Leverenz, 1950, page 358). It is also important to note in this connection that defocusing of the scanning spot actually results in a reduction in the intrinsic current density in the spot, even though the customary consideration of current density would indicate no change under these circumstances.

An important feature of the novel viewing screen of the invention is that the luminescent material of layer 8 is chosen to have the characteristic of being saturated at a relatively lower current density such that the luminescent material becomes more efficient when the scanning spot is defocused and the excitation density therefore reduced. Thus, in FIG. 6, the curve 19 represents the blue light emission of the silver-activated zinc sulphide, whereas the curve 20 represents the more efficient blue light emission of the same phosphor when the spot is defocused.

On the other hand, the silicate, being saturated only at high current density, does not increase the emission when the spot is defocused at low and medium current densities, a defocused spot producing a more efficient emission of light only when very high beam current densities are involved. Thus, again with reference to FIG. 6, the curve 21 represents the orange light emission of the manganese-activated zinc-beryllium silicate, whereas the curve 22 represents the slightly more efficient emission of the same phosphor when the spot is defocused.

Necessarily, the saturation of the two aforesaid phosphors is typically different with reference to the beam current density inherent to the total surface of the screen as well as to the intrinsic values in the spot, in all cases the saturation increasing with the current density no matter what reference is made, the proportion being an independent characteristic of each phosphor. In the present invention, however, I utilize not only these typical and independent characteristics of the two different phosphors, but also their specific interactions in connection with the relative positioning and proportioning of the two phosphor layers.

When the beam current density is extremely low and, therefore, also the excitation of the sulphide phosphor layer is extremly low, the excitation of the subsequent silicate phosphor layer is substantially insignificant, because only a few electrons may reach this layer and the orange light produced, being still lower than the blue light, may not significantly modify the hue of the blue light. Thus, the visual result is a range of color from black to dark blue. The interactions between the two phosphor layers become progressively manifest, therefore, insofar as the beam current density is sufficient to excite, notably, the two phosphor layers.

In a practical embodiment of my invention layer 7 can be of conventional thickness. Layer 8, on the other hand, can be considered as a very thin layer in comparison with the common dimensions of phosphor layers in cathode ray tubes. Since layer 8 is the first excited, and since this layer is very thin as compared to layer 7, much less scattering of the electrons of the beam occurs in layer 8 than in layer 7 and the excitation density in layer 8 is accordingly greater, for any given beam current density, than in lever 7. It is also to be noted that, since layer 7 is much thicker than layer 8, considerably more absorption and dissipation of energy occurs in layer 7 than in layer 8.

Because of the characteristics of the novel screen described hereinbefore, it is clear that, when the beam current density is extremely low, and the excitation of the material of layer 8 therefore also extremely low, the material of layer 7 will be excited only to an insignificant extent. Under these conditions, the visual result is a range of color from black to dark blue, the light emitted by layer 7 being inadequate to significantly modify the hue of the light emitted by layer 8. In general, the lower the beam current density, the greater will be the chromatic prevalence of the blue light from layer 8 over the orange light from layer 7. This relationship results because of three characteristic features. First, the phosphor employed in layer 8 is substantially more efficient at low current densities than is that employed in layer 7. Next, layer 8 is both thinner than layer 7 and is disposed to be the first layer excited by the electron beam. Finally, the blue and orange colors chosen as the primary colors in accordance with the invention have a luminance ratio adequate to assure the chromatic prevalence of the blue light even for approximately equal luminances of the blue and orange lights.

Conversely, if the beam current density is increased, the visual effect of the orange light from layer 7 will also increase. When the current density is high, the luminescent material of layer 8 is immediately and completely saturated, since this layer is very thin, is the first excited, and is excited by a scanning spot not yet markedly defocused by scattering of the electrons. Moreover, the material of layer 8 is doubly saturated, both by high current density with reference to the total screen surface and by high current density with reference to the intrinsic current density in the scanning spot. Under like conditions, the luminescent material of layer 7 is not saturated, and emits light very efficiently. The thickness of layer 7 is large as compared to that of layer 8, the light emission from layer 7 increases proportionally to the current density and therefore prevails progressively over the light emitted from layer 8 as the current density is increased.

Considering from the foregoing that the blue light from layer 8 prevails under conditions of low current density and the orange light from layer 7 prevails under conditions of high current density, it is evident that the colors intermediate between blue and orange can be produced with current densities intermediate between the very low and very high values. However, for proper attainment of the intermediate colors, it is also necessary that the mixtures of orange and blue light for the intermediate colors be proportioned in accordance with the sequence of the luminance value. In other words, the intermediate color combinations must correspond to a balanced sequence of luminance values.

Broadly, the intermediate color combinations are made to correspond to a desired balanced sequence of luminance values by having the blue light emitting layer 8 so thin that, not only is the layer 8 more efficiently excited at the lowest beam current densities and completely saturated as the current density begins to increase, but also the blue light emission of layer 8 remains small as compared to the increasing orange light emission of layer 7.

Figure 7:
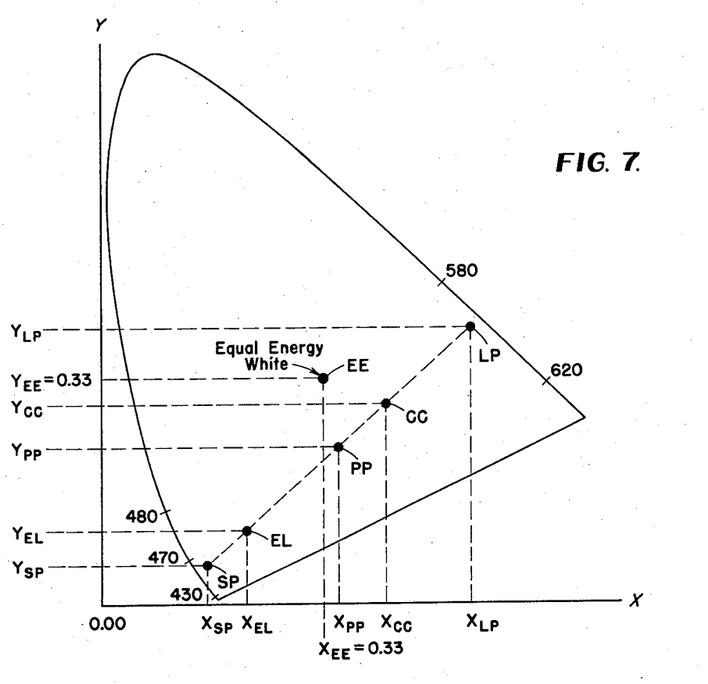
FIG. 7 is a chromaticity diagram further illustrating the relationships of the luminances produced by the luminescent materials employed.
Figure 8:
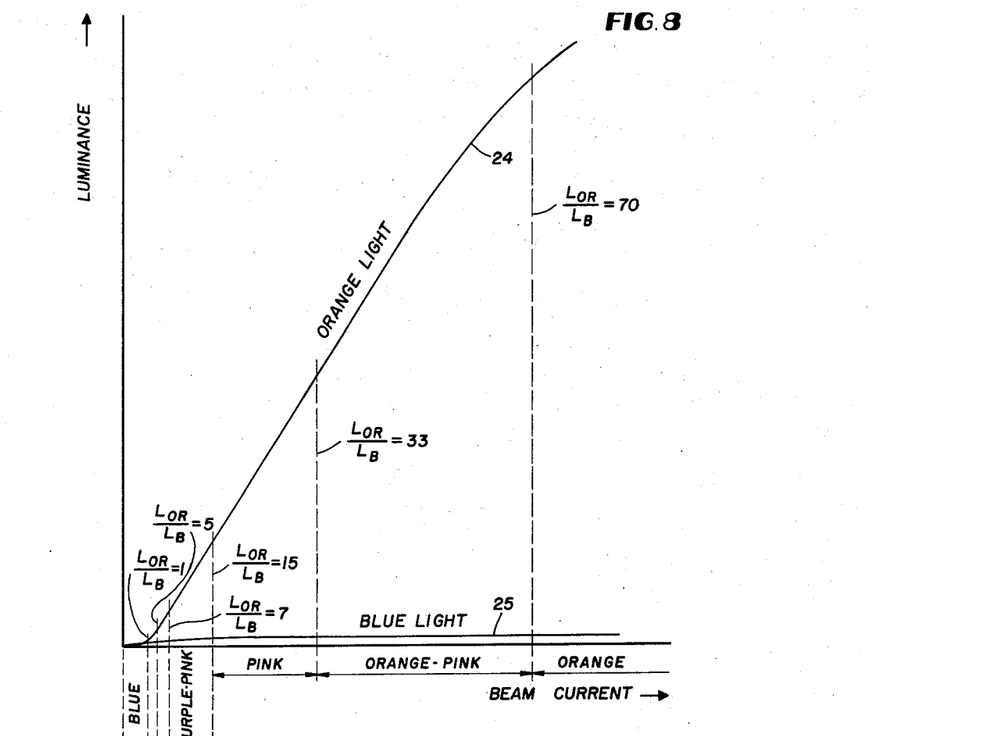
FIG. 8 is a graph, similar to that of FIG. 6, additionally illustrating the manner in which plural luminescent materials are employed in accordance with the invention to provide luminance ratios corresponding to a desired range of colors.

That the relative thickness of the two luminescent layers is of primary importance to achievement of the objects of the invention will be apparent from the following discussion with reference to the graphs of FIGS. 6–8.

It is known that the light emission of the zinc sulphide phosphor may have different values according to the silver activation, the structure of crystals, and various treatment. Also the color of the emitted light may be different; the shorter the wave length of the emitted light the lesser the visual efficiency. In any event, considering the manganese-activated zinc-beryllium silicate and the cubic silver-activated zinc sulphide as two phosphor layers of conventional thickness, it may be assumed for all practical purposes that the relative visual efficiency of the two layers is approximately the same. Thus, referring again to FIG. 6 and to the curves of these two phosphor layers, the curve 21 again representing the light emission of the silicate layer, and the dashed curve 23 the light emission of the sulphide layer, it will be seen that these two curves intersect each other at the point L corresponding to an intermediate beam current C, i.e., the only single point at which the luminances emitted by the two layers are really identical. Obviously, inasmuch as the silicate phosphor saturates by a much higher current density than the sulphide phosphor, at high current densities the luminance emitted by the silicate must prevail, and at low current densities the luminance emitted by the sulphide must prevail (An Introduction to Luminescence of Solids, by H. W. Leverenz, 1950, pages 355, 356, 440, 441).

Point L is that at which the luminance values of the light emitted by the two layers would be equal and the resultant color combination is determinable by means of the colorimetric data and the chromaticity diagram. By standard colorimetry, the ordinates of the chromaticity diagram represent the luminances of the color units, that is, the colors having a total tristimulus value equal to one. The luminance of any color is the product of the ordinate of the corresponding point in the chromaticity diagram times the total tristimulus value of the color itself. Since point L represents two colors of the same luminance, the ratio of the ordinates of the two colors is equal to the inverted ratio of the corresponding tristimulus values. Moreover, the color combination of two components having the same luminance falls on the line connecting the two colors in the chromaticity diagram and divides that line into two parts which are proportional to the ordinates of the two color components.

In FIG. 7, the two colors in question are represented by LP (the long wave light from the silicate phosphor) and SP (the short wave light from the sulfide phosphor), the corresponding color ordinates being $Y_{LP}$ and $Y_{SP}$. When the luminances of the two colors are equal, the color combination is represented by point EL, so located that the ratio $Y_{LP}/Y_{SP}$ is equal to the ratio of the distance between EL and LP to the distance between EL and SP. Thus, for the assumed case, the point EL corresponds to a color which is very near to the blue color SP and can be identified as a blue-violet or, more precisely, as a blue, a bluish violet or a purplish violet, depending upon the exact nature of the primary color represented by point SP.

From the foregoing, it will be understood that, so long as the two phosphor layers be assumed to have equal thicknesses, i.e., conventional practice, the blue light of layer 8 tends to predominate chromatically for almost all combinations of the two colors SP, LP, even though the silicate phosphor is more efficient at high current densities than is the sulfide phosphor.

Curves 19 and 21 of FIG. 6 can be employed to illustrate the effect of phosphor layers 7 and 8 when they are used as conventional layers, even if the orange emitting layer is more efficient. The curves correspond to phosphors so located in the chromaticity diagram that the ratio of $Y_{LP}$ to $Y_{SP}$ equals 4, the curves then intersecting at E, corresponding to a beam current A which produces light of the same luminance for both phosphors. The combined color generated by layers 7 and 8 is then a violet of medium saturation (FIG. 1).

By changing the primary colors so as to provide different ratios for their chromaticity ordinates, the color combinations corresponding to the same luminance emission in both layers will still shown an excessive predominance of the blue color and remain in the blue or violet zone of FIG. 1. This, even more so, considering that the choice of the two primary colors is necessarily limited by the chromatic characteristics of the specific transformation of black and white luminescent images into color images according to the present invention.

With reference to the aforesaid phosphors considered as conventional layers, and determining by means of other calculations the ratio of the luminances emitted by the two phosphor layers where the line connecting SP with LP intersects the limits of the purple-pink zone indicated in FIG. 1, one obtains, as shown in FIG. 6, the points K and F representing the luminances emitted by the beam current B, as well as the points M and H representing the luminances emitted by the beam current D, so that the purple-pink zone remains included between the values B and D of the beam current. In this way it can be seen that, beyond the point of the intersection E in which the luminances of the two primary colors are equal (beam current A), as one proceeds towards the orange primary color all color combinations produce an increasing predominance of the orange light emission. On the other hand, any conventional blue light emitting phosphor layer is more or less chromatically predominant in any color combination with any orange or near orange light emitting conventional phosphor layer. As a matter of fact, in general, the relative visual efficiencies of two conventional phosphor layers such as those considered, do not correspond in the least to the luminance ratios inherent in the color combinations to be attained by means of the present invention.

In the foregoing connection, it must be noted that any arrangement of two conventional phosphor layers, even if saturating at different current densities and emitting light of two adequate primary colors, is not capable of producing a fully extended and balanced sequence of color combinations of the type most suitable to replace black and white values with chromatic values in luminescent images.

In accordance with the practice of the present invention, upon an approximately conventionally-sized orange light emitting phosphor layer, I superimpose a blue light emitting phosphor layer so thin that it is more efficiently excited at lowest current densities, and completely saturated as the current density progressively increases, in conformity with the general conditions already specified, such that the blue light emission remains proportionately small in comparison with the increasing orange light emission, and the luminance ratios corresponding to the proper sequence of color combinations are finally attained, as described in greater detail hereinafter.

Again with reference to FIG. 7 of the drawings, the point CC indicates a generic color combination, and $Y_{CC}$ is the corresponding chromaticity ordinate which represents the luminance of the color combination CC having a total tristimulus value equal to one. Considering the luminances of the two primary colors SP and LP forming the color combination CC, due to standard colorimetry, the ratio of these two luminances is equal to the product of the ratio of the corresponding chromaticity ordinates times the ratio of the total tristimulus values inherent to the same luminances.

From the foregoing explanation, and considering the diagrams of FIGS. 1 and 7, it will be apparent that the luminescent material for layer 7 can be selected to emit light of a color primarily between 580 and 620 millimicrons, while the luminescent material of layer 8 can be selected to emit light of a color primarily between 430 and 480 millimicrons. The color components are chosen as a couple, any couple of primary colors near to 470 and 590 millimicrons, as well as any couple near to 475 and 595 millimicrons, being especially effective.

Once the two primary colors have been selected and located in the chromaticity diagram, as at LP and SP in FIG. 7, the ratio of the two total tristimulus values inherent to the color combination represented by any point on the line connecting the two primary colors can be determined and remains exactly fixed. The ratio of the luminances of the two color components resulting in such color combination is therefore also determined, so that the necessary characteristics of the two luminescent layers over the range of beam currents involved is now known.

The thickness of the short wave light emitting phosphor layer 8, in comparison with that of the long wave light emitting phosphor layer 7, must be reduced in proportion to the ratio of the corresponding chromaticity ordinates, as well as to the ratio of the relative efficiencies of the two phosphor layers and, moreover, according to the selective reflection characteristics of metallic film 9. Such reductions in thickness of the layer 8 must be related to the visual middle between the minimum and maximum brightnesses inherent to the conventional operation of the television receiver in question. Assuming that the relative efficiencies of the two phosphors employed are the same and that the metallic film is omitted, then layer 8 should be thinner than layer 7 by an amount in accordance with the ratio of the chromaticity ordinates.

FIG. 8 shows the appropriate luminance curves for the orange light to be emitted by luminescent layer 7 (curve 24) and the blue light to be emitted by luminescent layer 8 (curve 25) of the screen described hereinbefore with reference to FIG. 4. The indicated ratios $L_{OR}/L_B$ represent the ratios of the luminance of the orange light to the luminance of the blue light for the limits of the various color zones (e.g., purple, purple-pink, etc.) between the primary colors orange and blue. While the luminance ratios illustrated are related to a single ratio of the chromaticity ordinates equal to 10, similar determinations can be made for any other ratio of the chromaticity ordinates. In considering FIG. 8, it is to be understood that it is the ratios of the luminances which is basically important. The specific shape of the luminance curves makes no difference. It will be clear that, in FIG. 8, the luminance ratios progress with increasing beam current in such fashion that the blue light from layer 8 predominates only at very low luminances, therefore at low beam currents, and that the blue light not only remains low but is a progressively smaller proportion of the total luminance as the beam current increases to the relatively higher values which saturate the luminescent material of layer 7. This relationship is, for practical purposes, the same for any ratio of chromaticity ordinates selected in accordance with the invention. That is, so long as the phosphors chosen for layers 7 and 8 have the characteristics hereinbefore defined, the relation of the blue luminance to the total luminance is maintained generally in accordance with FIG. 8.

In this regard, the selective effect of metallic film 9 is important. Metal films in general, when employed as illustrated, have the effect of accomplishing a reduction of the amount of blue light from layer 8 which will be seen in the exhibited image, the amount of reduction depending upon the relative reflection factors of the particular metal for orange light and blue light. Thus, aluminum has a reflection factor for blue light which is about 10% less than that for orange light, while copper has a reflection factor for blue light which is about 40% less than its reflection factor for orange light. Hence, making film 9 of aluminum will aid in suppression of the blue light from layer 8, and making film 9 of copper will give a still greater suppression of the blue light.

If the selection of the primary colors is changed, a given luminance ratio in FIG. 8 then is related to a different ratio of the chromaticity ordinates and therefore represents a different color combination and, accordingly, the corresponding hues. It is thus apparent that, for each different ratio of the chromaticity ordinates of the two primary colors, the color sequence presented by the screen assumes a different position relative to the sequence of black and white values represented by the video signal. Such comparative shifting of the color sequence relative to the black and white sequence is important for two reasons. First, it allows different hues to be derived from the same beam current. Thus, by providing luminance ratios which properly shift the color sequence relative to the black and white sequence, I am able to provide the most balanced color range with respect to the black and white values of the signal. Second, it provides a very different comparative extension of all of the color zones of the chromaticity diagram when they are related to the range of the beam current, so that the best possible visual color arrangement can be achieved for the black and white values represented by the signal.

Considering the factors governing proper selection of the primary colors, it can be noted from the chromaticity diagram that the ratio of the ordinate of LP to the ordinate of SP has a range of numerical values from 2 to 20. Considering the characteristics of the most suitable known phosphors, this range is most advantageous when the numerical values are from 3 to 14.

With changes in the ratio of the chromaticity ordinates, each color combination is produced by different luminance ratios. The results are different, both psychophysically and visually. Thus, for the midpoint PP, between SP and LP, FIG. 7, the total tristimulus values of the two primary colors are equal, so that the ratio of the chromaticity ordinates equals the ratio of the luminances. Since point PP is approximately in the middle of the purple-pink zone of the chromaticity diagram, purple-pink can be obtained with an extended range of luminance ratios in accordance with the different ratios of the chromaticity ordinates. The lower the aforesaid ratio of the chromaticity ordinates and the aforesaid ratio of the luminances, the more all color combinations are shifted toward SP because the chromatic effects of this primary color increase as the ratios decrease. Conversely, the greater the ratio of the chromaticity ordinates and the ratio of the luminances, the more all color combinations are shifted toward LP.

When the ratio of the chromaticity ordinates is low and therefore the luminance of the blue light is relatively nearer that of the orange, then all color combinations are achieved by relatively low luminance ratios. The opposite is true when the ratio of the chromaticity ordinates is high and the luminance of the blue light therefore farther from that of the orange light. Nevertheless, through the range of color combinations, the luminance ratio increases with the total luminance. On the other hand, the highest luminance ratio of the two primary colors is limited by the highest luminance contrast possible in the particular television receiving apparatus to which the invention is applied, and by the existing environmental conditions. While the highest luminance contrast between large areas of a black and white television image is normally about 100, a television image can still be a satisfactory one if the luminance contrast is decidedly less than 100.

In accordance with the invention, the progression of the purple-pink, pink and orange-pink zones of the chromaticity diagram, representing all of the average complexion colors, is arranged so as to coincide with the progression of the intermediate luminances and highlights produced by conventional black and white television receivers. This arrangement does not imply any strict coincidence of values of the two progressions, inasmuch as the luminance sequence is not strictly determined and can be changed manually, by the viewer, through the brightness and contrast controls.

Best results are achieved when the luminance representing the visual middle of the full range of luminances commonly utilized is included within the purple-pink zone of the color sequence When this is done, variations of the luminance sequence do not change the exhibited colors to any excessive degree.

When the primary colors are properly selected and the color sequence properly related to the range of luminances in accordance with the invention, the following sequence of color combinations is obtained:

Black
Dark blue
Saturated bluish violet
Desaturated purplish violet
Desaturated purple
Purple-pink
Pink
Orange-pink
Orange Since this color sequence is a progression of continuously changing colors, it includes all the interposed transitions of hues and corresponding saturations. This color sequence is not, of course, necessarily included in every image produced by the luminescent screen because it is a specifically arranged translation of the luminance sequence provided in accordance with the received signal, the colors present depending upon the luminances present.

The image displayed is not limited to the color sequence set out just above. All the individual colors of the color sequence interact with each other, visually, and accordingly modify their hues by various contrast effects in conformity with the general law of color contrasts. Basically, color contrasts produce enhancements of the color differences between neighboring colors, the enhancements tending to shift the hue of each color toward the hue which is complementary to the neighboring color. For example, a violet near an orange appears more bluish. Such color enhancements depend upon the distribution of the colored areas in the image, which areas, in accordance with the invention, depend upon the luminance distribution in the image. When the two primary colors selected in accordance with the invention are blue and orange, two colors which are not complementary to each other, the colors which are complementary to the primary colors are, approximately, a blue-green and a greenish yellow. Obviously, with the two primary colors selected, color contrasts produce many visual color combinations in addition to the colors in the color sequence physically produced by the luminescent screen.

Figure 9:
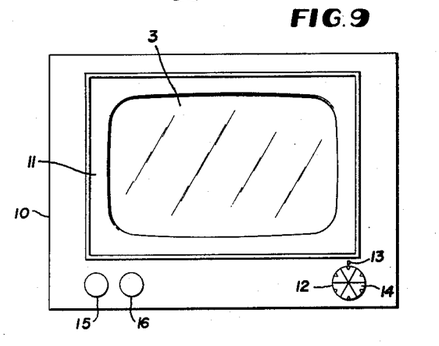
FIG. 9 is a front elevational view of a television receiving apparatus embodying the invention.

The invention also includes additional means for modifying and controlling the range of enhancing color differences. In FIG. 9, the television receiving apparatus is shown as including a casing 10 and embodies the picture tube of FIGS. 3 and 4 in such manner that the front face 3 of the tube is exposed for viewing. The screen area provided by front face 3 is surrounded by a frame 11 which is capable of both passing and diffusing light supplied to the rear face thereof. Thus, when a colored light is supplied, from within casing 10, to the rear face of frame 11, the frame has the appearance of a luminous surface of the color of the supplied light. The colored light can be supplied from any suitable conventional source or sources, not shown, such as an incandescent lamp provided with a filter having color segments which can be moved, into operative position with respect to the lamp, selectively.

Figure 10:
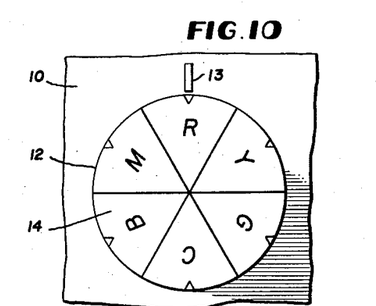
FIG. 10 is a front elevational view of an adjusting knob employed in the apparatus of FIG. 9.

If separate sources of red, green and blue light are employed in such fashion as to be operated both independently and in various selected combinations, the screen 11 can be illuminated with a full range of color contrasts in accordance with the classical additive synthesis. Such an arrangement of colored light sources can be employed in a manner now well known in the art so that the light sources are energized selectively by the viewer. Thus, the television receiver can be equipped with a control knob or dial 12, FIGS. 9 and 10, cooperating with an indicator 13 fixed to the front panel of the casing 10. The control knob can, for example, be visually divided into six segments, each provided with indicia corresponding to a desired color. Thus, as illustrated, the segments may be provided with the letters R, Y, G, C. B and M to represent red, yellow, green, cyan, blue and magenta, respectively. The knob 12 is coupled to a conventional selector switch, not shown, to energize the proper light source or sources in accordance with the segment registered with indicator 13.

The frame 11 is illuminated with a luminance corresponding approximately to the average luminance of the displayed images on the screen, so that a more constant and balanced level of adaptation is maintained. Thus, the brightness of luminous frame 11 is made to appear intermediate between shadows and highlights.

The frame 11 produces a shifting of all colors of the images displayed on the luminescent screen, such shift being toward the hue complementary to the color in which frame 11 is illuminated. The effect of the frame is related to its color extension, luminance and color saturation. Thus, all colored differences between colors of the displayed image and the color of the frame are enhanced, the enhancement being translated into a general shifting of all colors of the image toward that hue which is approximately complementary to the color of the luminous frame which has been selected by the viewer. It is thus apparent that I have provided means whereby the viewer can shift the colors of the displayed image in a preferred direction and so modify the image to be more pleasing to the particular viewer. In this way, the viewer is also able to harmonize the colors of the images with the particular program and with the illumination.

For example, illumination of frame 11 in magenta will make all complexion colors appear more pallid, while illumination of the frame in green will make the complexion colors appear more purplish. Shifting the luminous frame to yellow makes the orange-ping colors appear more pinkish and the pink colors less pink and more purplish. Illumination of the frame in blue will make all of the complexion colors less pink and more orange.

The color shiftings made possible by use of the colored luminous frame 11 combine with the color shiftings resulting from the contrasts between the colors generated by the luminescent layers 7 and 8 of the screen. It is thus seen that I have provided two types of color shifting which combine to increase the variety of color effects which can be obtained.

When the novel luminescent screen of the present invention is employed, the usual brightness control 15 and contrast control 16, operating conventional control means with which all black and white television receiving apparatus are equipped, both have novel functions. Thus, in addition to its usual function, operation of the brightness control will shift the entire colorimetric color sequence toward the long wave primary color (orange, as the invention has been specifically described) so that in the image those colors with high luminance are enhanced and those with low luminance are reduced, the long wave colors progressively predominating. The opposite effect is of course produced when brightness control 15 is operated by the viewer to decrease the brightness of the image.

In addition to its usual function, operation of the contrast control shifts the colors of the image in the same manner just described, insofar as such operation varies the brightness, and also reduces or amplifies the range of the colors which are intermediate in the color sequence generated by layers 7 and 8. Thus, operation of control 16 to increase the contrast tends to enhance both the orange highlights and the blue shadows and to reduce the purple-pink and pink. Operation of the control to decrease contrasts, on the other hand, tends to reduce the highlights and the shadows and to amplify the intermediate colors.

All of these effects of the brightness and contrast controls can be explained as color shiftings whereby, in each area of the displayed image, the hue is shifted toward the long wave primary color for an increase in luminance and toward the short wave primary color for a decrease in luminance. The combined effects of these two control means provide an extensive control of the color sequence since, in any colored area of the image, the hue can be shifted in either direction.

It is to be noted that the luminous frame 11, with its color selected by operation of knob 12, provides for a control of color contrasts which can be used by the viewer either independently of control of the color sequence by varying brightness and contrast or in conjunction therewith.

In general, colored images presented on the novel screen of the invention are brighter than the black and white images which could be derived conventionally from the same video signal. The selected primary colors both have saturation and hue, so that the Helmholtz-Kohlrausch effect ("Zur Photometrie farbiger Lichter," A. Kohlrausch, Light (1935), pp. 259–260) operates to make the two colors appear with an enhanced brightness proportional to the saturation of the colors.

When the novel luminescent screen of the present invention is employed with the two primary colors selected as described, the resulting image involves the effect of chromatic stereoscopy and is therefore, for the purposes of the average viewer, a much more desirable image than that which would be obtained from the same video signal by conventional monochromatic reproduction. It is recognized that colors between red and yellow are all advancing colors and that blue colors are receding colors. Since the perception of shadows is psychologically associated with the perception of hollow and deep things, the receding effect of blue colors has an evident psychological foundation. Recent scientific investigations show that short wave colors in general are receding colors and that long wave colors in general are advancing colors because of the chromatic stereoscopy resulting from the chromatic difference of magnification with reference to a black background ("Recent Advances in the Physiology of Vision," Hamilton Hartridge, Section 13: Chromatic Stereoscopy (London, 1950), pp. 102–106). Television images are, of course, usually observed in a darkened room or, in any event, in an environment which is relatively dark in comparison with the appearance of the luminescent screen. Accordingly, the environmental conditions are normally such that the two selected primary colors of which an image produced in accordance with the invention is composed provide a marked effect of chromatic stereoscopy. As a matter of fact, the two primary colors specifically selected in accordance with the invention as described, namely, blue and orange, are the two colors which are most effective in producing chromatic stereoscopy. Since chromatic stereoscopy is completely absent in black and white television images, so that such images remain essentially, uniformly flat, the colored images produced in accordance with the present invention have, in comparison, a much more natural appearance, the effect of chromatic stereoscopy providing a much better visual representation of the various objects making up the image.

It is also to be noted that the effect of chromatic stereoscopy exhibited in the colored images produced in accordance with the present invention can be enhanced by the viewer's use of the contrast control. Thus, increasing the contrast reduces the intermediate colors of the color sequence and enhances the two selected primary colors. This means that increasing the contrast will also increase the extent to which the effect of chromatic stereoscopy is exhibited.

Finally, it is to be noted that the novel viewing screen of the present invention operates to give each object in the image a color which, while it may not be an accurate representation of the actual color of that object, is nevertheless effective to suggest that object to the viewer. Television images are effective and pleasing only insofar as they show objects, such as persons, landscape components, etc., in a manner which the viewer can associate with his recollections, that is, with how similar objects appeared when he actually viewed them directly. In images produced in accordance with the invention, the colors of some things which are readily identifiable by the viewer are reproduced with reasonable accuracy. Thus, where the primary colors are blue and orange and the multi-layer luminescent screen is constructed in accordance with the invention, the average complexion colors of the human skin are displayed with acceptably accurate color reproduction, and the colors of highlighted and shadowed objects are suggested with a color reproduction which, while it cannot be termed to be accurate, is sufficient to stimulate the viewer's recollection of similar scene components.

In the foregoing, it has been pointed out in detail that the invention employs luminescent layers 7 and 8 which each emit, upon excitation, a different primary color. It is a particularly novel feature of the invention that the two primary colors employed are not complementary at all. Since the two primary colors are not complementary, mixtures thereof, such as result when luminescent layers 7 and 8 are excited, have all different hues rather than only two hues, as would be true if complementary primary colors were employed. Further, the hues produced in accordance with the invention are a range of hues showing, practically, the greatest variations which can be obtained with two primary colors.

It will be understood that a particularly advantageous embodiment of the invention has been specifically described for illustrative purposes and that various changes and modifications are possible without departing from the scope of the appended claims.

I claim:

1. In a screen for generating colored images when excited from an excitation source disposed at one side of the screen, the combination of a transparent support and two layers of luminescent material superposed on said support in such fashion that one of said layers is excited before the other, the one of said layers which is first excited being of luminescent material saturating at lower excitation densities and the other of said layers being of luminescent material saturating at markedly higher excitation densities than the material of said first-excited layer, the lights emitted by said luminescent materials being of such colors that all color combinations resulting from different proportions of colored lights emitted by said layers have different hues, said layers having thicknesses so proportioned that excitation of said layers at predetermined different excitation levels produces predetermined different hues.

2. In a screen for producing luminescent colored images when excited from an excitation source disposed at one side of the screen, the combination of a transparent support and two layers of luminescent material superposed on said support in such fashion that one of said layers is excited before the other, the one of said layers which is first excited being of luminescent material saturating at lower excitation densities, the other of said layers being of luminescent material saturating at markedly higher excitation densities than the material of said first-excited layer and, when so excited, emitting a colored light having a hue included between yellow and red, said luminescent materials emitting, when so excited, such colored lights that all combinations resulting from different proportions thereof produce different hues, said first excited layer being thinner than the other of said layers and the thicknesses of said layers being so proportioned that predetermined excitation levels produce average complexion colors.

3. In a picture tube of the general type used in black and white television receiving sets and comprising means for generating and operating an electron beam modulated by monochromatic video signals, the combination of a transparent support and two superposed luminescent layers adhered thereto, said support and layers being so disposed that said layers are successively excited by the electron beam, the one of said layers which is first excited by the electron beam being of luminescent material saturating at low current densities and emitting short wave colored light, the other of said layers being of luminescent material saturating at markedly higher current densities and emitting a colored light having a hue included between yellow and red, said luminescent materials emitting such specifically colored lights that all combinations resulting from different proportions of the colored lights emitted by said layers produce different hues, said first-excited layer being thinner than the other of said layers and the thicknesses of said layers being so proportioned that predetermined different current densities produce predetermined different hues.

4. In a picture tube of the general type used in black and white television receiving sets and comprising means for generating and operating an electron beam modulated by monochromatic video signals, the combination of a transparent support and two superposed luminescent layers adhered thereto, said support and layers being so disposed that said layers are successively excited by an electron beam, the one of said layers which is first excited by the electron beam being of luminescent material saturating at low current densities and emitting short wave colored light, the other of said layers being of luminescent material saturating at markedly higher current densities and emitting a colored light having a hue included between yellow and red, said luminescent materials emitting such specifically colored lights that all combinations resulting from different proportions of the colored lights emitted by said layers produce different hues inclusive of average complexion colors, said first-excited layer being thinner than the other of said layers and the thicknesses of said layers being so proportioned that current densities corresponding to average brightness effects produce average complexion colors.

5. In a picture tube of the general type used in black and white television receiving sets and comprising means for generating and operating an electron beam modulated by monochromatic video signals, and a transparent support constituting the viewing area of the tube and having a surface directed toward the electron beam source, the combination of two superposed luminescent layers adhered to said surface of the transparent support, and a metallic film overlying said layers on the surface thereof opposite the support, the one of said layers first excited by the electron beam being of luminescent material saturating at lower current densities and emitting short-wave length light when excited by the electron beam, the other of said layers being of luminescent material saturating at markedly higher current densities and emitting colored light having a hue included between yellow and red when excited by the electron beam, said luminescent materials emitting such specifically colored lights that all combinations resulting from different proportions of the colored lights emitted by said layers and reflected by said metallic film produce different hues, said first-excited layer being thinner than the other of said layers, the thicknesses of said layers and the selective reflecting property of said metallic film for the colors emitted by said layers being so proportioned that predetermined different current densities produce different ratios of the luminances of the colored lights emitted by said layers corresponding to predetermined different hues.

6. In a picture tube of the general type used in black and white television receiving sets and comprising means for generating and operating an electron beam modulated by monochromatic video signals, and a transparent support constituting the viewing area of the tube and having a surface directed toward the electron beam source, the combination of two superposed luminescent layers adhered to said surface of the transparent support, and a metallic film overlying said layers on the surface thereof opposite the support, the one of said layers first excited by the electron beam being of luminescent material saturating at lower current densities and emitting short-wave length light when exicted by the electron beam, the other of said layers being of luminescent material saturating at markedly higher current densities and emitting colored light having a hue included between yellow and red when excited by the electron beam, said luminescent materials emitting such specifically colored lights that all combinations resulting from different proportions of the colored lights emitted by said layers and reflected by said metallic film produce different hues inclusive of average complexion color, each of said layers being transparent to light emitted by the other, said first-excited layer being thinner than the other of said layers, the thicknesses of said layers and the selective reflecting property of said metallic film for the colors of light emitted by said layers being so proportioned that the current densities corresponding to average brightness effects produce average complexion colors.

7. In a television receiver of the type electronically equipped for monochromatic reception and comprising means for generating an electron beam and modulating the same in accordance with received monochromatic video signals, and control means for controlling image brightness and contrast, the combination of a transparent support and two superposed luminescent layers adhered to said support and disposed to be excited successively by the electron beam, the one of said layers which is first excited by the electron beam being of luminescent material saturating at low current densities and emitting short wave colored light, the other of said layers being of luminescent material saturating at markedly higher current densities and emitting a colored light having a hue included between yellow and red, said luminescent materials emitting such specifically colored lights that all combinations resulting from different proportions of the colored lights emitted by said layers produce different hues, said first-excited layer being thinner than the other of said layers and the thicknesses of said layers being so proportioned that predetermined different current densities produce predetermined different hues, operation of the control means of the receiver to increase brightness causing all color combinations in the image obtained by excitation of said layers to be shifted toward the hue of the longer wave length color component, operation of the control means to increase contrast causing the range of the intermediate color combinations to be reduced, and operation of the control means to decrease contrast causing the range of intermediate color combinations to be extended.

8. A television receiver in accordance with claim 7 and further comprising a frame constructed and arranged to provide a colored luminous surface surrounding the image presented when said layers are excited, and means for changing the hue and brightness of said colored luminous surface in conformity with effects to be obtained.

9. In a television receiver of the type electronically equipped for monochromatic reception and comprising means for generating an electron beam and modulating the same in accordance with received monochromatic video signals, and control means for controlling image brightness and contrast, the combination of two superposed luminescent layers adhered to said surface of the transparent support, and a metallic film overlying said layers on the surface thereof opposite the support, the one of said layers first excited by the electron beam being of luminescent material saturating at lower current densities and emitting short wave length light when excited by the electron beam, the other of said layers being of luminescent material saturating at markedly higher current densities and emitting colored light having a hue included between yellow and red when excited by the electron beam, said luminescent materials emitting such specifically colored lights that all combinations resulting from different proportions of the colored lights emitted by said layers and reflected by said metallic film produce different hues, said first-excited layer being thinner than the other of said layers, the thicknesses of said layers and the selective reflecting property of said metallic film for the colors emitted by said layers being so proportioned that predetermined different current densities produce different ratios of the luminances of the colored lights emitted by said layers corresponding to predetermined different hues, operation of the control means of the receiver to increase brightness causing all color combinations in the image obtained by excitation of said layers to be shifted toward the hue of the longer wave length color component, operation of the control means to increase contrast causing the range of the intermediate color combinations to be reduced, and operation of the control means to decrease contrast causing the range of intermediate color combinations to be extended.

10. A television receiver in accordance with claim 9 and further comprising a frame constructed and arranged to provide a colored luminous surface surrounding the image presented when said layers are excited, and means for changing the hue and brightness of said colored luminous surface, in conformity with effects to be obtained.

11. An image display screen comprising, in combination, means presenting a supporting surface, and a pair of superposed luminescent layers adhered to said surface, one of said layers being markedly thinner than the other and of luminescent material saturating at a lower current density and effective to emit colored light of a predetermined shorter wave length when excited, the other of said layers being of luminescent material saturating at markedly higher current density and effective, when excited, to emit colored light of a predetermined longer wave length having a hue included between yellow and red, the colors of said shorter wave length and longer wave length lights being non-complementary.

12. An image display screen in accordance with claim 11 and wherein said means presenting the supporting surface is transparent, the thicker of said layers being adjacent to said supporting surface and the thinner of said layers overlying said thicker layer, said screen further comprising a reflecting film overlying said thinner layer and having a greater reflection factor for said longer wave length light than for said shorter wave length light.

13. In a television receiving apparatus, the combination of a cathode ray tube comprising an envelope, an electron beam source, said envelope including a transparent wall constituting a screen area spaced from said source in the direction of travel of the electron beam therefrom, a first phosphor layer continuously overlying the surface of said wall facing said source, and a second phosphor layer continuously overlying said first layer, said first layer being effective to emit colored light of a predetermined longer wave length when excited by an electron beam from said source, said second layer being markedly thinner than said first layer and effective to emit colored light of a predetermined shorter wave length when excited by an electron beam from said source, the phosphor of said second layer saturating at a markedly lower beam current density than the phosphor of said first layer.

14. A television receiving apparatus in accordance with claim 13 and further comprising means presenting a luminous frame surrounding said screen area, and means for selectively controlling the color of light emitted from said frame.

15. A television receiving apparatus in accordance with claim 13, and further comprising means for controlling brightness and contrast, a colored picture being obtained in which upon increasing the brightness all the average complexion colors in said picture are shifted toward the hue of the longer wave color component and upon decreasing the brightness all the average complexion colors in said picture are shifted toward the hue of the short-wave color component, and wherein by increasing the contrast the range of the average complexion colors is reduced and by decreasing the contrast the range of the average complexion colors is extended.

References Cited in the file of this patent

UNITED STATES PATENTS

| | | |
|---|---|---|
| 2,547,775 | Ramberg | Apr. 3, 1951 |
| 2,654,675 | Thierfelder | Oct. 6, 1953 |
| 2,779,938 | Pifer | Jan. 29, 1957 |
| 2,980,550 | Seats | Apr. 18, 1961 |